(12) United States Patent
Goel et al.

(10) Patent No.: US 8,139,591 B1
(45) Date of Patent: *Mar. 20, 2012

(54) METHODS AND APPARATUS FOR RANGE MATCHING DURING PACKET CLASSIFICATION BASED ON A LINKED-NODE STRUCTURE

(75) Inventors: Deepak Goel, Sunnyvale, CA (US); Ramesh Panwar, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/874,681

(22) Filed: Sep. 2, 2010

Related U.S. Application Data

(63) Continuation of application No. 12/242,125, filed on Sep. 30, 2008, now Pat. No. 7,796,541.

(51) Int. Cl.
*H04L 12/28* (2006.01)

(52) U.S. Cl. .................. 370/401; 370/392; 370/256

(58) Field of Classification Search ................ None
See application file for complete search history.

(56) References Cited

U.S. PATENT DOCUMENTS

| | | | |
|---|---|---|---|
| 4,215,402 A | 7/1980 | Mitchell et al. | |
| 5,463,777 A * | 10/1995 | Bialkowski et al. | .............. 1/1 |
| 5,473,607 A | 12/1995 | Hausman et al. | |
| 5,495,476 A | 2/1996 | Kumar | |
| 6,073,160 A | 6/2000 | Grantham et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,457,058 B1 | 9/2002 | Ullum et al. | |
| 6,587,466 B1 | 7/2003 | Bhattacharya et al. | |
| 6,600,741 B1 | 7/2003 | Chrin et al. | |
| 6,600,744 B1 | 7/2003 | Carr et al. | |
| 6,614,789 B1 * | 9/2003 | Yazdani et al. | .............. 370/392 |
| 6,618,397 B1 | 9/2003 | Huang | |
| 6,654,373 B1 | 11/2003 | Maher, III et al. | |
| 6,658,482 B1 | 12/2003 | Chen et al. | |
| 6,665,274 B1 | 12/2003 | Yamada | |
| 6,675,163 B1 | 1/2004 | Bass et al. | |
| 6,721,316 B1 | 4/2004 | Epps et al. | |
| 6,731,631 B1 | 5/2004 | Chang et al. | |
| 6,731,644 B1 | 5/2004 | Epps et al. | |
| 6,735,670 B1 | 5/2004 | Bronstein et al. | |
| 6,754,662 B1 | 6/2004 | Li | |
| 6,778,532 B1 | 8/2004 | Akahane et al. | |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — Duc C Ho
(74) *Attorney, Agent, or Firm* — Cooley LLP

(57) ABSTRACT

In one embodiment, a method includes receiving a key associated with a portion of a data packet, comparing the key to a first range extreme, selecting a second range extreme, and comparing the key with the second range. The first range extreme is associated with a first range and the second range is associated with a second range. The second range is selected based on the comparing the key to the first range extreme. The method includes producing a policy vector associated with the first or second range.

20 Claims, 7 Drawing Sheets

U.S. PATENT DOCUMENTS

| | | |
|---|---|---|
| 6,778,546 B1 | 8/2004 | Epps et al. |
| 6,778,984 B1 | 8/2004 | Lu et al. |
| 6,789,118 B1 | 9/2004 | Rao |
| 6,813,243 B1 | 11/2004 | Epps et al. |
| 6,859,455 B1 | 2/2005 | Yazdani et al. |
| 6,862,278 B1 | 3/2005 | Chang et al. |
| 6,889,225 B2 | 5/2005 | Cheng et al. |
| 6,917,946 B2 | 7/2005 | Corl, Jr. et al. |
| 6,925,085 B1 | 8/2005 | Krishna et al. |
| 6,940,862 B2 | 9/2005 | Goudreau |
| 6,947,931 B1 | 9/2005 | Bass et al. |
| 6,977,930 B1 | 12/2005 | Epps et al. |
| 7,042,878 B2 | 5/2006 | Li |
| 7,089,240 B2 | 8/2006 | Basso et al. |
| 7,133,400 B1 | 11/2006 | Henderson et al. |
| 7,136,926 B1 | 11/2006 | Iyer et al. |
| 7,173,931 B2 | 2/2007 | Chao et al. |
| 7,190,696 B1 | 3/2007 | Manur et al. |
| 7,193,997 B2 | 3/2007 | Van Lunteren et al. |
| 7,227,842 B1 | 6/2007 | Ji et al. |
| 7,233,568 B2 | 6/2007 | Goodman et al. |
| 7,233,579 B1 | 6/2007 | Crump et al. |
| 7,277,429 B2 | 10/2007 | Norman et al. |
| 7,304,992 B2 | 12/2007 | Relan |
| 7,317,723 B1 | 1/2008 | Guru |
| 7,325,074 B2 | 1/2008 | McRae |
| 7,349,415 B2 | 3/2008 | Rangarajan et al. |
| 7,356,033 B2 | 4/2008 | Basu et al. |
| 7,369,561 B2 | 5/2008 | Wybenga et al. |
| 7,373,345 B2 | 5/2008 | Carpentier et al. |
| 7,382,637 B1 | 6/2008 | Rathnavelu et al. |
| 7,382,777 B2 | 6/2008 | Irish et al. |
| 7,382,876 B2 | 6/2008 | Lauter et al. |
| 7,383,244 B2 | 6/2008 | Bass et al. |
| 7,394,809 B2 | 7/2008 | Kumar et al. |
| 7,403,524 B2 | 7/2008 | Hill |
| 7,403,526 B1 | 7/2008 | Zou et al. |
| 7,403,999 B2 | 7/2008 | Corl, Jr. et al. |
| 7,418,505 B2 | 8/2008 | Lim et al. |
| 7,424,744 B1 | 9/2008 | Wu et al. |
| 7,441,268 B2 | 10/2008 | Remedios |
| 7,480,302 B2 | 1/2009 | Choi |
| 7,525,958 B2 | 4/2009 | Kumar et al. |
| 7,543,052 B1 | 6/2009 | Cesa Klein |
| 7,602,787 B2 | 10/2009 | Cheriton |
| 7,610,330 B1 | 10/2009 | Quinn et al. |
| 7,646,771 B2 | 1/2010 | Guru et al. |
| 7,668,160 B2 | 2/2010 | Narayan et al. |
| 7,738,454 B1 | 6/2010 | Panwar et al. |
| 7,796,541 B1 * | 9/2010 | Goel et al. ............... 370/256 |
| 7,835,357 B2 | 11/2010 | Panwar et al. |
| 7,889,741 B1 | 2/2011 | Panwar et al. |
| 2002/0138648 A1 | 9/2002 | Liu |
| 2002/0152209 A1 | 10/2002 | Merugu et al. |
| 2002/0191605 A1 | 12/2002 | Lunteren et al. |
| 2003/0023846 A1 | 1/2003 | Krishna et al. |
| 2003/0030575 A1 | 2/2003 | Frachtenberg et al. |
| 2003/0053460 A1 | 3/2003 | Suda et al. |
| 2003/0059045 A1 | 3/2003 | Ruehle |
| 2003/0156586 A1 | 8/2003 | Lee et al. |
| 2003/0219017 A1 | 11/2003 | Davis et al. |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0028046 A1 | 2/2004 | Govindarajan et al. |
| 2004/0095936 A1 | 5/2004 | O'Neill et al. |
| 2004/0100950 A1 | 5/2004 | Basu et al. |
| 2004/0100959 A1 | 5/2004 | Relan |
| 2004/0105422 A1 * | 6/2004 | Sahni et al. ............... 370/351 |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0083935 A1 | 4/2005 | Kounavis et al. |
| 2005/0141510 A1 | 6/2005 | Narsinh et al. |
| 2005/0146449 A1 | 7/2005 | Adl-Tabatabai et al. |
| 2005/0226235 A1 | 10/2005 | Kumar et al. |
| 2005/0232261 A1 | 10/2005 | Wybenga et al. |
| 2005/0237938 A1 | 10/2005 | Corl, Jr. et al. |
| 2006/0050690 A1 | 3/2006 | Epps et al. |
| 2006/0083247 A1 | 4/2006 | Mehta |
| 2006/0195896 A1 | 8/2006 | Fulp et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2007/0008962 A1 | 1/2007 | Basu et al. |
| 2007/0070900 A1 | 3/2007 | Heink et al. |
| 2007/0071233 A1 | 3/2007 | Zak |
| 2007/0115986 A1 | 5/2007 | Shankara |
| 2007/0133593 A1 | 6/2007 | Shankara |
| 2007/0234005 A1 | 10/2007 | Erlingsson et al. |
| 2007/0283045 A1 | 12/2007 | Nguyen et al. |
| 2008/0052300 A1 * | 2/2008 | Horgan ............... 707/100 |
| 2008/0162698 A1 | 7/2008 | Hopen et al. |
| 2008/0177812 A1 | 7/2008 | Brandle |
| 2008/0186974 A1 | 8/2008 | Singh et al. |
| 2008/0205403 A1 | 8/2008 | Akyol et al. |
| 2008/0205405 A1 | 8/2008 | Corl et al. |
| 2008/0212586 A1 | 9/2008 | Wang et al. |
| 2008/0228798 A1 | 9/2008 | Van Lunteren |
| 2009/0196297 A1 | 8/2009 | Jabr |
| 2010/0040067 A1 | 2/2010 | Hao et al. |
| 2010/0080224 A1 | 4/2010 | Panwar et al. |
| 2010/0083345 A1 | 4/2010 | Panwar et al. |
| 2011/0134916 A1 | 6/2011 | Panwar et al. |
| 2011/0200038 A1 | 8/2011 | Panwar et al. |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed Feb. 16, 2010 for U.S. Appl. No. 12/242,172 (11 pages).

Office Action mailed May 10, 2010 for U.S. Appl. No. 12/242,143 (23 pages).

Office Action mailed Apr. 23, 2010 for U.S. Appl. No. 12/347,495 (11 pages).

Office Action mailed Jun. 10, 2010 for U.S. Appl. No. 12/242,278, filed Sep. 30, 2008 (24 pages).

U.S. Appl. No. 12/242,143, filed Sep. 30, 2008, entitled "Methods and Apparatus for Compression in Packet Classification" (34 pgs).

U.S. Appl. No. 12/242,278, filed Sep. 30, 2008, entitled "Methods and Apparatus to Implement Except Condition During Data Packet Classification" (35 pgs).

U.S. Appl. No. 12/794,175, filed Jun. 4, 2010 entitled "Methods and Apparatus Related to Packet Classification Based on Range Values" (42 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,495, filed Dec. 31, 2008 entitled "Methods and Apparatus for Packet Classification Based on Multiple Conditions" (40 pgs).

U.S. Appl. No. 12/347,499, filed Dec. 31, 2008 entitled "Methods and Apparatus for Packet Classification Based on Multiple Conditions" (41 pgs).

U.S. Appl. No. 12/347,418, filed Dec. 31, 2008 entitled "Methods and Apparatus for Indexing Set Bit Values in a Long Vector Associated with a Switch Fabric" (35 pgs).

Final Office Action mailed Dec. 17, 2010 for U.S. Appl. No. 12/242,143 (29 pages).

Office Action mailed Sep. 2, 2010 for U.S. Appl. No. 12/242,168 (5 pages).

Final Office Action mailed Oct. 13, 2010 for U.S. Appl. No. 12/347,495 (14 pages).

Office Action mailed Mar. 22, 2011 for U.S. Appl. No. 12/347,495 (11 pages).

* cited by examiner

METHODS AND APPARATUS FOR RANGE MATCHING DURING PACKET CLASSIFICATION BASED ON A LINKED-NODE STRUCTURE

CROSS REFERENCE TO RELATED APPLICATION

This application is a continuation of and claims priority to U.S. application Ser. No. 12/242,125, filed Sep. 30, 2008 entitled "Methods and Apparatus for Range Matching During Packet Classification Based on a Linked-Node Structure," now U.S. Pat. No. 7,796,541, which is incorporated herein by reference in its entirety.

BACKGROUND

Embodiments described herein relate generally to linked-node structures, and, in particular, to a linked-node structure configured to determine a range from a group of ranges including a key.

Determining a narrowest range of values including an input value from a group of ranges of values is often referred to as the range match problem. The range match problem is complicated by the fact that it involves at least two dimensions of analysis: the size of the ranges and the values included in the ranges. Thus, for each input value, it is necessary to determine which ranges from the group of ranges include the input value and which of those ranges is the most narrow. Neither ordering the ranges by size nor by beginning or ending value greatly simplifies the range matching problem. Common known solutions to the range matching problem involve brute force or exhaustive algorithms often implemented by many parallel range comparators.

One example of the range matching problem occurs in network switches, which often compare input values with a group of ranges to determine a best fit or most narrow range to properly route a data packet. The range matching problem can be particularly troublesome in such high-speed applications because the worst case behavior of known solutions imposes an upper limit on the number of data packets that can be processed per unit time. Although in many cases the worst case behavior is not observed, a network switch cannot be guaranteed to operate faster than the limit imposed by the worst case behavior of a given solution to the range matching problem. Thus, a need exists for improved methods and apparatus for improved worst case behavior of solutions to the range matching problem.

SUMMARY OF THE INVENTION

In one embodiment, a method includes receiving a key associated with a portion of a data packet, comparing the key to a first range extreme, selecting a second range extreme, and comparing the key with the second range. The first range extreme is associated with a first range and the second range is associated with a second range. The second range is selected based on the comparing the key to the first range extreme. The method includes producing a policy vector associated with the first or second range.

DETAILED DESCRIPTION

Figure 1:
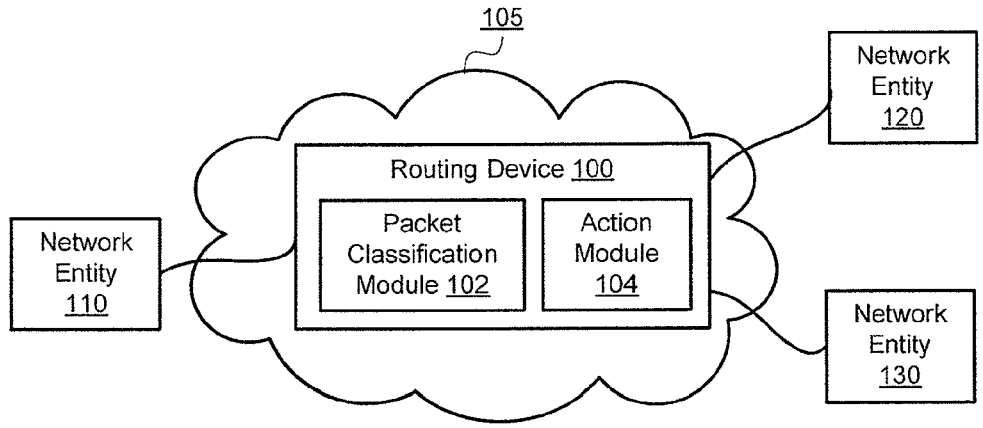
FIG. 1 is a system block diagram of a packet routing system, according to an embodiment.

A packet classification module at a multi-stage switch can be configured to classify a data packet (e.g., an Internet Protocol (IP) packet, a session control protocol packet, a media packet) received at the multi-stage switch from a network entity. Classifying can include any processing performed so that the data packet can be processed at the multi-stage switch based on a policy. In some embodiments, the policy can include one or more conditions that are associated with an instruction that can be executed at the multi-stage switch. For example, one or more portions (e.g., a field, a payload, an address portion, a port portion) of the data packet can be analyzed by the packet classification module based on a condition defined within a policy. When the condition is satisfied, the data packet can be processed based on an instruction associated with the condition. In some embodiments, a data packet can be associated with a policy vector that can include one or more bit values that represent whether or not a condition associated with a policy has been satisfied based on processing of a portion of the data packet. The policy vector can be used to trigger processing of the data packet at the multi-stage switch based on an instruction associated with the policy (when the bit value(s) indicate that the condition has been satisfied). In some embodiments, a policy vector can be referred to as a facet cover vector.

Characteristics of certain linked-node structures, such as trees, can be used to more efficiently determine a range including an input value from a group of ranges during packet classification. Linked-node structures are organizations of data sets partitioned into similar nodes where each node is linked to at least one other node in the structure. Often, the individual nodes are stored in a memory and the linked-node structure is used to organize the individual memory elements or locations. Common linked-node structures include linked lists, trees, and tries. Trees can be particularly useful for organizing information. Trees are linked-node structures that begin with a root node and each node is linked to two or more nodes. The number of nodes to which each node in the tree can be linked can be referred to as the tree's dimension. For example, a two-way or binary tree has a dimension of two because each node in the tree can be linked to two nodes. Each level of a tree can contain a number of nodes equal to the tree's dimension raised to the power of the level. For example, level zero of a binary includes one ($2^0$) node, level one can contain two ($2^1$) nodes, level two can contain four ($2^2$) nodes, level three can contain eight ($2^3$) nodes, etc. Thus, trees grow or expand outward faster than vertically.

Each node in a tree has a value that is used in comparisons with an input value to determine whether a match of the input value exists in the tree. Additionally, the comparison is used to determine which link of a node to follow to traverse to the next level of the tree if the node value does not match the input value. These comparisons order the tree such that only a small portion of the nodes in the tree are compared with the input value to find a match to the input value if a match exists. If a match does not exist, the worst case behavior is limited by the number of levels or depth of the tree, rather than by the number of nodes in the list. For example, a binary tree with seven nodes can be searched for a match to an input value with at worst three comparisons. Searching a simple linked-list with seven nodes requires at worst seven comparisons.

A properly processed or organized list of ranges can be organized as a tree to reduce the worst case behavior of a solution to the range matching problem. Such a solution results in comparing only a few of the ranges from the list of ranges with each input value or key rather than comparing each range in the list of ranges with each input value or key. Furthermore, because fewer comparisons are used to solve the range matching problem, apparatus can be smaller, can operate faster, and constructed more economically because fewer comparators are used.

In some embodiments, a memory can be configured to store nodes organized as a tree and included in a multi-stage switch, and to retrieve a policy vector associated with a range from a database based on an input value such as a key vector. The key vector can be defined based on at least a portion of a data packet (e.g., an Internet Protocol (IP) packet) received at the multi-stage switch. The multi-stage switch can include a switch fabric that has multiple stages. In some embodiments, the policy vector retrieved from the database can be configured to trigger the multi-stage switch to process the data packet. Specifically, the policy vector can include one or more bit values that represent whether or not a condition (e.g., a match condition, a filter condition, an except condition) associated with a policy has been satisfied. The policy vector can be used to trigger processing of the data packet at the multi-stage switch based on an instruction associated with the policy (when the bit value(s) indicate that the condition has been satisfied). In some embodiments, the memory can be implemented in hardware and/or software. In some embodiments, the policy vector can be referred to as a facet cover vector.

FIG. 1 is a system block diagram of a packet routing system, according to an embodiment. The packet routing system illustrated in FIG. 1 includes network entity 110, network entity 120 and network entity 130 operatively coupled to network 105. Network entity 110, network entity 120 and network entity 130 can be any of a variety of devices configured to be operatively coupled to and in communication with one or more other network entities via network 105. For example, network entity 110, network entity 120 and network entity 130 can be computers or computer servers; network-attached storage devices; mobile devices such as personal digital assistants, cellular phones; embedded network devices such as network-attached sensors or machinery; and/or any other device configured to communicate with network 105.

Network 105 can be any network configured to provide communication between two or more network entities. In some embodiments, network entities are considered to be part of the network to which they are attached. Network 105 can be, for example, a packet switching network in which network devices are operatively coupled one to another via wired connections, wireless connections, and/or optical connections.

In some embodiments, network entities are operatively coupled directly one to another. In some embodiments, network entities are operatively coupled one to another via, for example, a network hub, network switch, network router, and/or a network core surrounded by edge servers. In some embodiments, a network can be homogenous such as, for example, a fiber channel network in which each network entity communicates with other network entities using a fiber channel. In some embodiments, a network is heterogeneous and includes, for example, sub-networks operatively coupled to network entities, and the sub-networks are operatively coupled to and in communication one with another such that a network entity operatively coupled to one sub-network can communicate with a network entity operatively coupled to another sub-network. The sub-networks can be operatively coupled via, for example, network bridges, network gateways, network switches, and/or network routers.

The system illustrated in FIG. 1 includes routing device 100. Routing device 100 is configured to be in communication with network entity 110, network entity 120 and network entity 130 within network 105, and to route data packets from one network entity to another network entity. In one embodiment, for example, routing device 100 is network switch in a packet switching network. Following this example, routing device 100 can receive a data packet from network entity 110 addressed to network entity 120, and a data packet from network entity 130 addressed to network entity 110. Routing device 100 can then route (e.g., send or forward) the data packet from network entity 110 to network entity 120 based on an address value within that data packet, and the data packet from network entity 130 to network entity 110 based on an address value within that data packet. In other embodiments, a routing device can route data packets based on one or more parameters associated with the data packets other than an address value.

Routing device 100 includes policy classification module 102 and action module 104. Policy classification module 102 is configured to determine an appropriate policy vector for data packets received by routing device 100 based on one or more portions of the data packets. A policy vector can include information or instructions configured to cause action module 104 to route data packets through routing device 100 and/or another routing or switching device such as, for example, a switch fabric (not shown) operatively coupled to routing device 100. In some embodiments, a policy vector is a bit vector in which each bit is associated with an instruction configured to result in an action such as, for example, a data packet being discarded or a data packet being forwarded to a particular egress queue in a network switch.

In some embodiments, a policy classification module can receive a portion of a data packet through a network received by a routing device and can perform a lookup based on the received portion to determine a policy vector associated with the portion of the data packet. For example, in a packet switching network, a routing device can receive a data packet including a destination port value. A policy classification module can then determine a policy vector based on the destination port value by retrieving the policy vector from a table of policy vectors. In one embodiment, the destination port value, or a portion of the destination port value, can correspond to an index into a table of policy vectors. In another embodiment, the destination port value can be used by the policy classification module to determine an index into a table of policy vectors by, for example, searching a database of ranges of destination port values with associated indices for a range of destination port values that includes the destination port value. The index can be used by the policy classification module to access the policy vector in the table of policy vectors. In some embodiments, the index can be an address value associated with a memory location of a policy vector in a table in a memory.

Action module 104 is operatively coupled to policy classification module 102 and configured to receive a policy vector from policy classification module 102. Action module 104 is configured to receive a policy vector from policy classification module 102 and process a data packet based on the policy vector. In some embodiments, a policy vector can be configured to include all the information necessary for a action module to route a data packet. In other embodiments, the policy vector can be configured such that each element in the policy vector provides an indication that a condition is satisfied. In some such embodiments, a action module can be configured to determine an action associated with the satisfied condition prior to routing a network communication. More details related to conditions such as except conditions and match conditions in packet classification are set forth in co-pending U.S. patent application Ser. No. 12/242,278, filed on Sep. 30, 2008, and entitled "Methods and Apparatus to Implement Except Condition During Data Packet Classification," which is incorporated herein by reference in its entirety.

In some embodiments, an action module can include or be operatively coupled to a switch fabric such as a switch core of a data center that has multiple stages (e.g., an ingress stage, an egress stage, a middle stage) through which data can be routed. In some embodiments, a switch core can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, a switch core can be defined by one or more multi-stage switches (not shown) that each include one or more switch fabrics.

Figure 2:
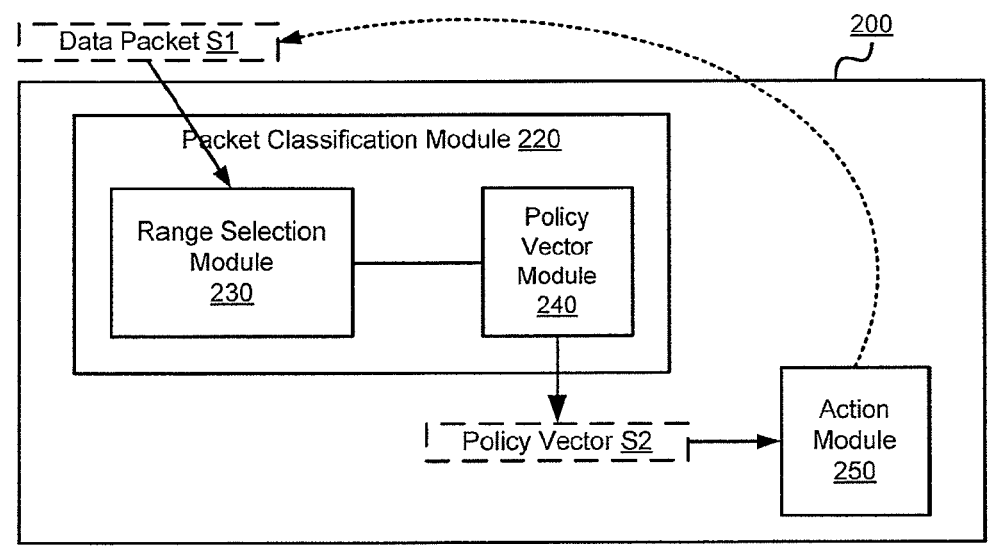
FIG. 2 is a system block diagram of a routing device, according to an embodiment of the invention.

FIG. 2 is a system block diagram of a routing device, according to an embodiment of the invention. Routing device 200 includes policy classification module 220 and action module 250. Policy classification module 220 includes a range selection module 230 and a policy classification module 240 operatively coupled to action module 250. Range selection module 230 is configured to determine a range of values that includes a value from data packet S1, and to produce data associated with the range of values. In some embodiments, a range selection module can be configured to determine a best fit range for a value such as, for example, the narrowest range or broadest range including a value from a database of ranges. Data associated with a range of values can include, for example, a representation of a range of values, an index or address value of, for example, a policy vector in a table or database, and/or a policy vector. In other words, the value from data packet S1 is a key in range selection module 230 that is used to access data associated with a range of values.

Range selection module 230 can be configured to determine a range including a value based on a linked-node structure such as a tree. For example, ranges can be associated with nodes organized into a binary tree structure and the binary tree structure can be traversed to determine an appropriate range. Such an organization can reduce the search time for an appropriate range. Additionally, nodes having associated ranges can be organized into higher dimensional (e.g., 3-way or 4-way trees) tree structures to further reduce search times.

Policy vector module 240 is configured to receive data associated with a range from range selection module 230 and produce policy vector S2 based on that data. In some embodiments, a policy vector module can receive a range from a range selection module and determine a policy vector associated with that range by, for example, searching a database or table for an entry including the range and the policy vector. In other embodiments, a policy vector module can receive an index or address value of a policy vector associated with the range and stored in a memory. In some embodiments, a policy vector module can be integrated with a range selection module such that the range selection module produces a policy vector directly.

Action module 250, as described with respect to FIG. 2, is configured to receive policy vector S2 from policy classification module 220 and invoke a network action on data packet S1 based on an instruction associated with a portion of policy vector S2. A network action can be, for example, to drop or discard data packet S1, to forward data packet S1 to a particular port of a network switch, and/or to alter a portion of data packet S1.

Figure 3:
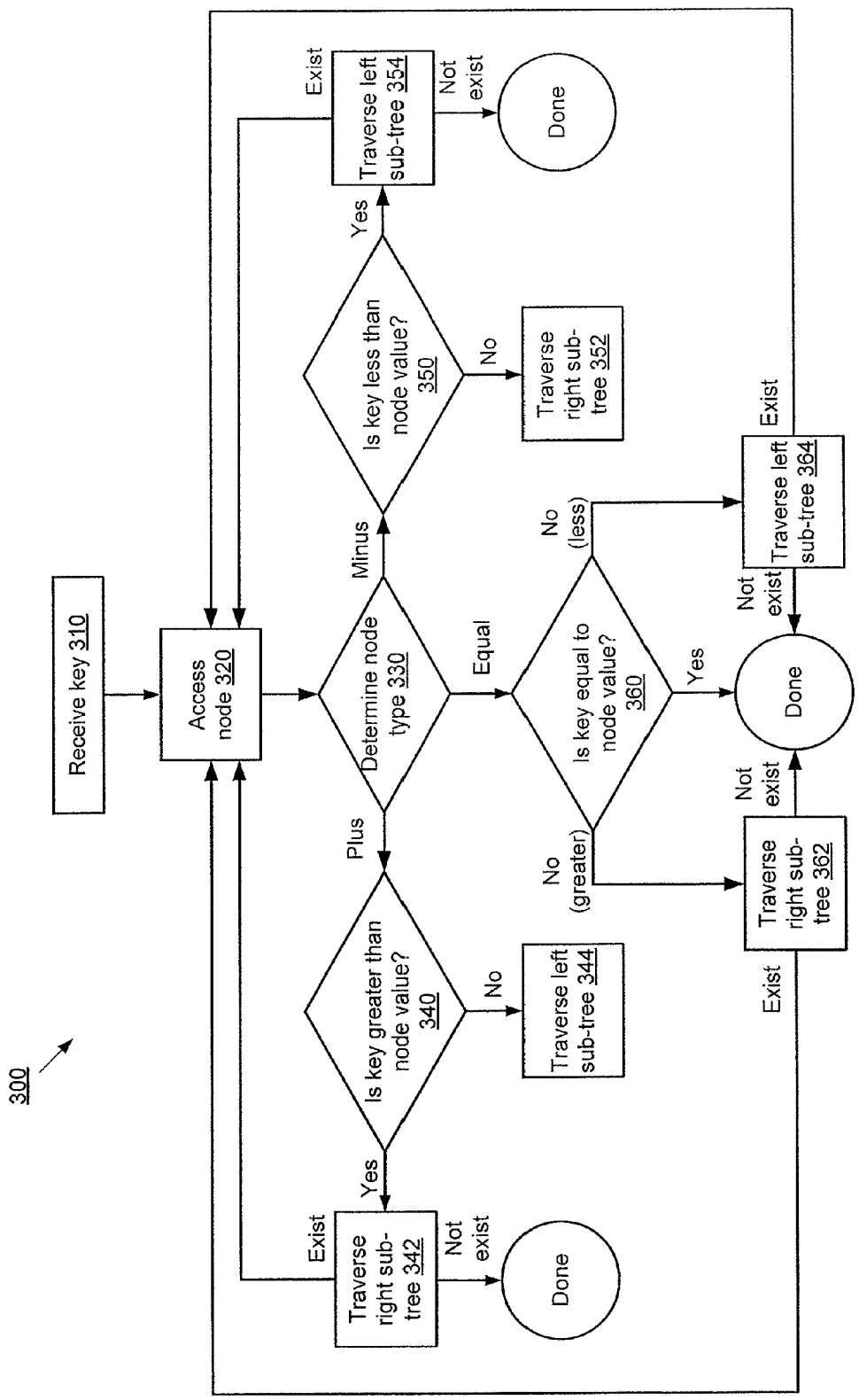
FIG. 3 is a flow chart of process 300 for selecting a range of values using a binary tree structure, according to an embodiment.

FIG. 3 is a flow chart of process 300 for selecting a range of values using a binary tree structure, according to an embodiment. Each node in the binary tree is associated with or represents a range of values and stores various parameters including, for example, a node value associated with a range extreme of a range of values associated with a node in the binary tree; a node type indicator; a reference to a right node; a reference to a left node; and/or a representation of a range of values associated with the node. In some embodiments, an index or address value configured to provide access to a policy vector associated with the range of values represented by a node in a table of policy vectors is included in place of or in addition to the representation of range of values. In other embodiments, a policy vector or a compressed policy vector is included in place of or in addition to the representation of range of values. In some embodiments, a node type can be related to another parameter of a node such as a node value. For example, a node value can be an extreme of a range (e.g., a high end of a range or a low end of a range) and a node type can be an extrema type or a range extreme type indicating whether the extreme is a high extreme of a range or a low extreme of a range. In some embodiments, each node can store additional data including, for example, a range associated with that node.

The reference to a right node and the reference to the left node can be, for example, identifiers or an address values of other nodes in the tree. Said differently, the references point to other nodes. These references link nodes in the tree to other nodes in the tree and allow the tree to be traversed or searched starting from a root node by accessing nodes referenced or linked by other nodes. Nodes that are referenced by other nodes can be referred to as sub-roots of sub-trees. A sub-tree is a portion of a tree beginning with a node of the tree that is not the root of the tree. In other words, a sub-tree is a sub-portion of the tree. The node at the beginning of a sub-tree can be referred to as a sub-root. Thus, the reference to a right node of a node in the binary tree can link to a right sub-root of a right sub-tree, and the reference to a right node of a node in the binary tree can link to a left sub-root of a left sub-tree. Accordingly, the reference to the right node of a node can be referred to as a right sub-root or a right sub-tree, and the reference to the left node of a node can be referred to as a left sub-root or left sub-tree. Additionally, a node can be referred to as a parent and a right sub-root and a left sub-root can be referred to as a right child and a left child, respectively.

Because the binary tree includes only a finite number of nodes, however, the reference to one or both of the right node and the left node of some nodes do not point to other nodes. Rather, such references are assigned a special value indicating the reference does not reference a node. For example, in some embodiments, the reference to the left node and the right node are address values associated with the locations of nodes within a memory. The memory location zero or null can be defined as invalid and used to indicate that a reference does not point to another node. Thus, a reference with the address value null can indicate that a reference does not point to another node. Said differently, a reference with the address value null is an invalid sub-root or child, and a sub-tree associated with such a sub-root does not exist. Nodes that point to no other nodes (i.e., neither the reference to the left node nor the reference to the right node points to a node) can be referred to as leaves.

The nodes of the binary tree are organized such that all nodes to the right of a node have node values greater than or equal to the node value of the node. Accordingly, all nodes to the left of a node have node values less than the node value of the node. Although process 300 will be described with reference to the convention described above, the binary tree could also be organized such that nodes to the right of a node have node values greater than the node value of the node, and nodes to the left of a node have node values less than or equal to the node value of the node. Similarly, the left and right orientation can be interchanged (i.e., left and right can be substituted one for another in the examples above). Such variations can result in variations in process 300.

Figure 4:
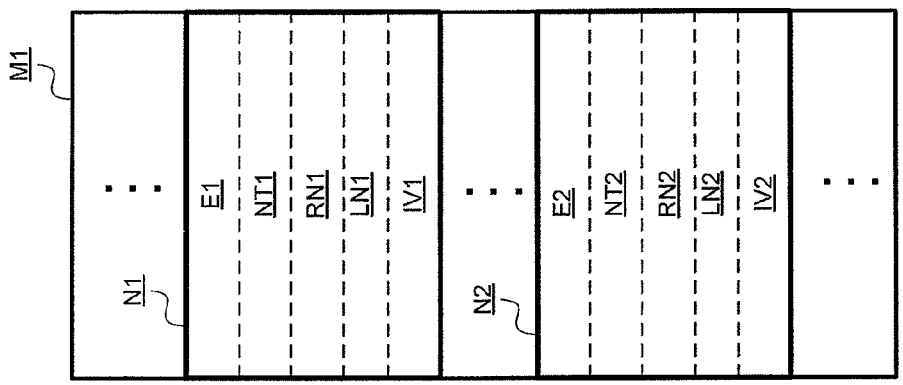
FIG. 4 illustrates an example of nodes in a memory, according to an embodiment.

In some embodiments, each node in the binary tree (or a representation of each node) is stored in a memory. FIG. 4 illustrates an example of nodes in a memory, according to an embodiment. N1 and N2 are representations of nodes in memory M1, each of which include node parameters stored in memory M1. A representation of a node in a memory can be referred to as a node for ease of reference, and it should be understood that the node parameters are stored in the memory. As illustrated in FIG. 4, a node or representation of a node in a memory N1 includes a range extreme E1, a node type indicator NT1, a reference to a right node RN1, a reference to a left node LN1, and an index value IV1 of a policy vector associated with the range represented by node N1. Similarly, node N2 includes a range extreme E2, a node type indicator NT2, a reference to a right node RN2, a reference to a left node LN2, and an index value IV2 of a policy vector associated with the range represented by node N2.

Returning now to FIG. 3, process 300 can be implemented, for example, by a hardware module such as a discrete logic module, a field programmable gate array ("FPGA") and/or an application specific integrated circuit ("ASIC"), or by a processor executing instructions stored in a memory. As illustrated in FIG. 3, a key is received at 310. In some embodiments, the key is a value that can be compared with ranges of values associated with the nodes of a binary tree. More specifically, for example, the key can be a portion of a data packet such as, for example, a destination port value or a source port value of an Internet Protocol ("IP") packet. In some embodiments, the key can be a combination or a tuple of multiple portions of a data packet. For example, the key can be a protocol identifier such as a transmission control protocol ("TCP") identifier or user/universal datagram protocol ("UDP") identifier, and a source or destination port value. In some such embodiments, only a portion of the key is compared with node values associated with each node of a binary tree.

After a key has been received at 310, a node in the binary tree is accessed at 320. The first node accessed in the binary tree is generally the root or starting node of the tree. The root node acts as a known starting point for searching or traversing the tree. When a node in the binary tree is accessed at 320, the parameters of the node can be read. In one embodiment, a node is stored in a portion of a memory; parameters of the node can be read from the memory based on an address value of the location of the node in the memory and an offset for each parameter. In some embodiments, a hardware module or processor caches the parameters (i.e., reads the parameters from a node and stores them temporarily in a cache memory accessible to the hardware module) for use during execution of process 300. In some embodiments, a hardware module or processor, reads parameters of the node just prior to using them. In some embodiments, a hardware module or processor caches some parameters and reads other parameters just prior to using them.

Process 300 varies based on the node type. At 330, the node type indicator of the node accessed at 320 is interpreted to determine the node type. As illustrated in FIG. 3, three node types are possible: a plus node type indicates that the node range extreme is the high or upper extreme of a range; a minus node type indicates the node range extreme is the low or bottom extreme of a range; and an equal node type indicates the node range extreme is a range extreme of a range including only a single value (i.e., the low value of the range is equal to the high value of the range).

If the node type indicator is of a plus node type, the key is compared with the node value at 340 to determine whether the key is greater than the node value. If the key is greater than the node value, the policy vector data of the node is remembered or cached and the right sub-tree of the node is traversed at 342 by returning to 320 to access the right sub-root if the right sub-tree exists. If the right sub-tree does not exist at 342, process 300 is complete and has a result of the policy vector data. If the key is less than or equal to the node value at 340, the left sub-tree of the node is traversed at 344 by returning to 320 to access the left sub-root if the left sub-tree exists. If the left sub-tree does not exist at 344, process 300 is complete and has a result of the most recently cached policy vector data.

If the node type indicator is of a minus node type, the key is compared with the node value at 350 to determine whether the key is less than the node value. If the key is less than the node value at 350, the left sub-tree of the node is traversed at 354 by returning to 320 to access the left sub-root if the left sub-tree exists. If the left sub-tree does not exist at 354, process 300 is complete and has a result of the most recently cached policy vector data. If the key is greater than or equal to the node value at 350, the data associated with a policy vector of the node is cached and the right sub-tree of the node is traversed at 352 by returning to 320 to access the right sub-root if the right sub-tree exists. If the right sub-tree does not exist at 352, process 300 is complete and has a result of the policy vector data of the node.

Finally, if the node type indicator is of an equal node type, the key is compared with the node value at 360 to determine whether the key is equal to the node value. If the key is equal to the node value at 360, process 300 is complete and the data associated with a policy vector of the node is selected as the result of process 300. If the key is greater than the node value at 360, the right sub-tree of the node is traversed at 362 by returning to 320 to access the right sub-root if the right sub-tree exists. If the right sub-tree does not exist at 362, process 300 is complete and has a result of the most recently cached policy vector data. If the key is less than the node value at 360, the left sub-tree of the node is traversed at 364 by returning to 320 to access the left sub-root if the left sub-tree exists. If the left sub-tree does not exist at 364, process 300 is complete and has a result of the most recently cached policy vector data.

Process 300 is repeated until one of the complete conditions described above is reached. If no policy vector data has been cached before process 300 reaches a complete condition having a result of the most recently cached policy vector data, process 300 has a result indicating that no appropriate range exists in the binary tree. In other words, such a result indicates that the key or portion thereof used for comparison with the node values of nodes in the binary tree is not included in a range associated with any node in the binary tree.

In some embodiments, the binary tree searched by process 300 is a balanced binary tree. A balanced binary tree is a binary tree in which the nodes are arranged such that the number of nodes between the root node and any leaf node (referred to a leaf depth or height) is substantially constant. In one embodiment of a balanced binary tree, the number of nodes between the root node and each leaf node differs by no more than two nodes. Balanced binary trees can be used, for example, to reduce the average number of iterations in process 300 before process 300 reaches a complete condition. Unbalanced trees often result in some leaf nodes having a much greater depth than others. Because process 300 can often traverse a binary tree from its root to a leaf node, the disparity in depth can result in significant variation in the time required to traverse a binary tree from the root to a leaf node. Balanced trees have little disparity between leaf node depths resulting in a vertically more dense tree. Additionally, in some embodiments, a memory can be configured to store a balanced binary tree with fewer empty or wasted memory location than an unbalanced binary tree.

In some embodiments, process 300 can be extended to apply to tree structures of higher dimensions. In one embodiment, for example, process 300 can be applied to a four-way tree.

Figure 6:
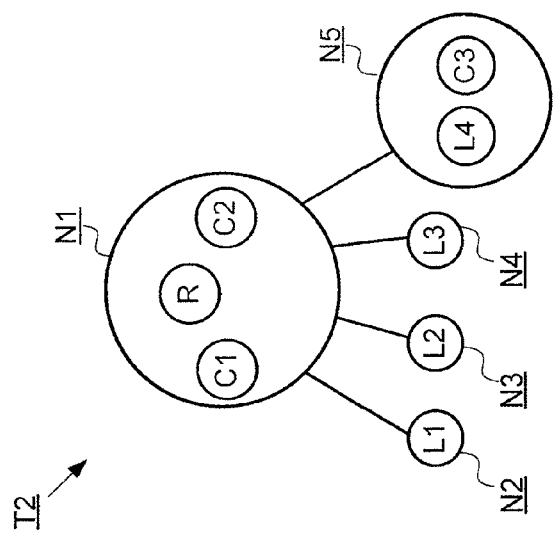
FIG. 6 is an illustration of the balanced binary tree of FIG. 3B organized as a four-way tree.
Figure 5:
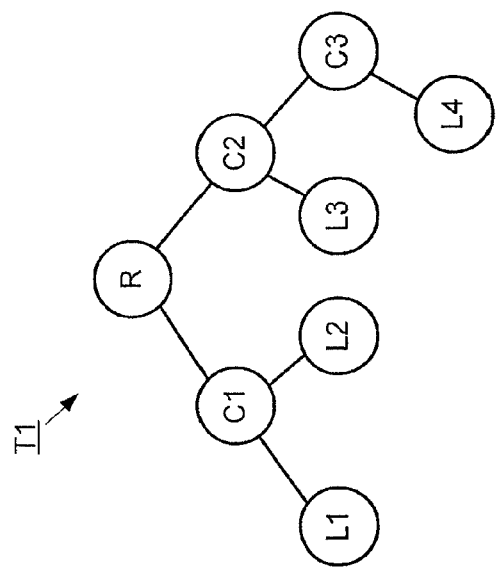
FIG. 5 is an illustration of a balanced binary tree.

FIG. 5 is an example of balanced binary tree T1. FIG. 6 is an example of binary tree T1 of FIG. 5 organized as a four-way tree T2. Four-way tree T2 includes nodes N1, N2, N3, N4, and N5, and is constructed or translated from the data or information of tree T1 by collecting the parameters of a binary tree node and its right child and left child into a single four-way tree node. The children of the right child and left child collected into the four-way tree node become the children of the four-way tree node. Thus, each four-way tree node can have four children. The collecting is repeated for each child node of the four-way tree until the binary tree has been converted to a four-way tree. For example, in tree T2, the parameters of nodes R, C1, and C2 are included in node N1 and the parameters of nodes L4 and C3 are included in node N5.

A four-way tree is traversed in a manner similar to a binary tree, but rather than comparing a key with a single node value to determine which child node will be accessed in the next iteration of the traversal, the key is compared with the three node values collected from the binary tree to determine which child node will be accessed in the next iteration of the traversal. Thus, the selection of the next node to be traversed in a four-way tree depends on a relationship between the key and one or more of the node values of a four-way node. For example, in tree T2, a relationship between the value of C1, R, and C2 will determine whether the next node in the traversal is N2, N3, N4, or N5. In one embodiment, the value of C2 is greater than the value of R and the value of R is greater than the value of C1. From node N1, node N2 is the next node if a key value is less than the value of C1, node N3 is the next node if the key value is greater than the value of C1 and less than the value of R, node N4 is the next node if the key value is greater than the value of R and less than the value of C2, and node N5 is the next node if the key value is greater than the value of C2. In some embodiments, the key is compared with each node value of a four-way tree node serially. In some embodiments, the key is compared with each node value of a four-way tree node in parallel. For example, a hardware comparison module can be configured to simultaneously or substantially simultaneously compare a key with each of the three node values of a four-way tree node.

Similar to a binary tree, a four-way tree can be balanced to reduce the average depth of leaf nodes in the tree. In some embodiments, a binary or four-way tree can be balanced dynamically as nodes are added to the tree. In some embodiments, a balanced binary or four-way tree structure can be produced statically based on, for example, a known number of nodes and the nodes added to the balanced tree structure after it is produced. In some embodiments, a balanced binary or four-way tree structure can be produced statically and rebalanced dynamically as nodes are added to the tree.

In some embodiments, a tree other than a binary or four-way tree can be used to determine a range including a key. For example, an eight-way tree can be used to determine a range including a key.

Figure 7:
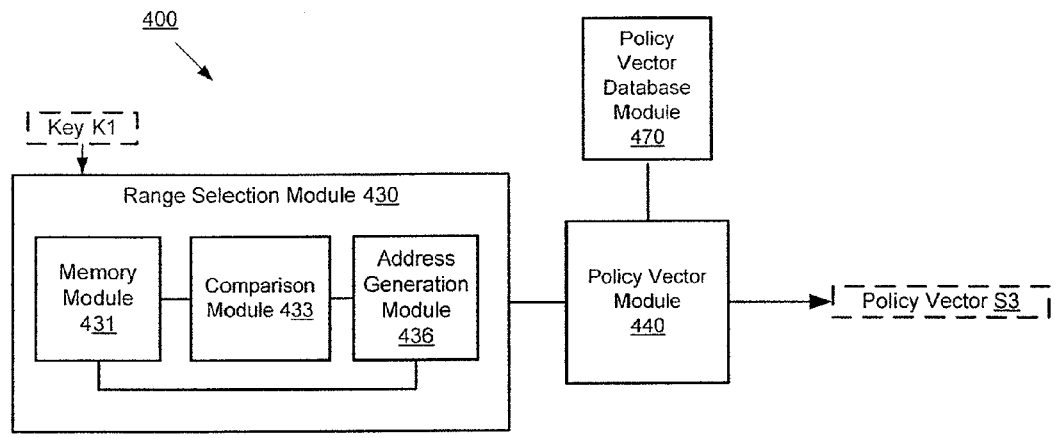
FIG. 7 is a system block diagram of a system for producing a policy vector associated with a key based on a tree structure, according to an embodiment.

FIG. 7 is a system block diagram of a system for producing a policy vector associated with a key based on a tree structure, according to an embodiment. Range selection module 430 is configured to determine a best fit range for a key from a group of ranges associated with nodes in the tree structure and provide an index value to policy vector module 440. In some embodiments, the best fit range is the narrowest or most specific range including a key or value. Range selection module 430 includes memory module 431, comparison module 433 and address generation module 436. Memory module 431 is operatively coupled to comparison module 433, comparison module 433 is operatively coupled to address generation module 436, and address generation module 436 is operatively coupled to memory module 431.

Memory module 431 is configured to store the nodes of the tree including parameters associated with the nodes of the tree. Range selection module 430 has access to a reference or address value of the memory location within memory module 431 at which the root node of the tree is located. In some embodiments, a range selection module can store the reference. This reference provides a starting node for traversals of one or more trees located in memory module 431. Similar to the binary tree discussed in relation to process 300 of FIG. 3, each node in memory module 431 is associated with a range of values and stores various parameters including: a node value associated with a range extreme of a range of values associated with a node in memory module 431; a node type indicator; an address value of the location in memory module 431 of a right child node; an address value of the location in memory module 431 of a left child node; and an index or address value configured to provide access to a policy vector associated with the range of values associated with that node. In some embodiments, a policy vector or a compressed policy vector is included in place of the index value. In some embodiments, memory module 431 is configured such that each node can store additional data including, for example, a range associated with that node.

Memory module 431 is operatively coupled to comparison module 433 such that memory module 431 can provide the node value of a node selected within memory module 431 to comparison module 433. Comparison module 433 is further configured to receive key K1 and compare key K1 with node values of nodes in memory module 431. After comparison module 433 compares key K1 with a node, comparison module 433 provides a result of the comparison to address generation module 436. The result can indicate a relationship between key K1 and the node value such as, for example, key K1 is greater than the node value, key K1 is less than the node value, and/or key K1 is equal to the node value.

Address generation module 436 is operatively coupled to memory module 431 and comparison module 433 such that address generation module 436 can receive the result from comparison module 433 and access the node type value and address values of right and left children of nodes in address module 431. Address generation module 436 receives the result of the comparison from comparison module 433, and accesses or reads the node type indicator from the node having the node value compared with key K1 by comparison module 433 to determine whether the address value of the node's left child or right child will be provided to memory module 431. Address generation module 436 can determine which address value to provide to memory module 431, for example, based on a truth table. For example, for the binary tree discussed with respect to FIG. 3 the following truth table provides an appropriate address value:

| Node Type | Result of Comparison | Address Value |
| --- | --- | --- |
| Plus | Key greater than node value | Right child |
| Plus | Key less than or equal to node value | Left child |
| Minus | Key less than node value | Left child |
| Minus | Key greater than or equal to node value | Right child |
| Equal | Key greater than node value | Right child |
| Equal | Key less than node value | Left child |
| Equal | Key equal to node value | Done |

In some embodiments, range selection module 430 is implemented in hardware and address generation module 436 includes logic configured to produce a result based on a truth table.

As discussed above in relation to FIG. 3, if the address value is a right child of a node of type plus or of type minus, or if the address value is a left child or a right child of a node of type equal, range selection module 430 caches the address value configured to provide access to a policy vector of the node. If the address value does not indicate an invalid sub-tree, the address value determined by address generation module 440 is provided to memory module 431. The node value of the node at the memory location associated with the address value provided by address generation module 436 is then accessed by comparison module 433. This process repeats within range selection module 430 until a best fit range is selected or range selection module 430 determines that no node is memory module 431 is associated with a range including key K1.

If the address value of the right or left child of a node indicates an invalid sub-tree, or if key K1 is equal to the node value of a node of type equal, the range selection is complete and range selection module 436 produces an index value. As described above in relation to FIG. 3, the index value can be (1) a cached address value configured to provide access to a policy vector of a node in memory module 431, (2) an address value configured to provide access to a policy vector of the node in memory module 431 having the invalid left or right sub-tree, (3) an indication that no node in memory module 431 is associated with a range including key K1, or (4) an address value configured to provide access to a policy vector of a node of type equal associated with a range having a single value equal to the key.

After a best fit range is selected or range selection module 430 determines that no node is memory module 431 is associated with a range including key K1, policy vector module 440 receives the index value from range selection module 430 and produces policy vector S3 based on the index value. In some embodiments, policy vector module produces a compressed or encoded policy vector, which is decompressed or decoded in a decompression module. More details related to compression and decompression within a packet classification module are set forth in co-pending U.S. patent application Ser. No. 12/242,143, filed on Sep. 30, 2008, and entitled "Methods and Apparatus for Compression in Packet Classification," which is incorporated herein by reference in its entirety. In some embodiments, the index value is an index in a table of policy vectors within policy vector module 440. In some embodiments, the index value is an address value of a location of policy vector S3 in a memory (not shown). In some embodiments, the memory can be included in policy vector module 440. In some embodiments, a policy vector database module 450 including a memory (not shown) configured to store policy vectors is operatively coupled to policy vector module 440 such that policy vector module 440 can access policy vectors in policy vector database 450.

In some embodiments, policy vector database module 470 is operatively coupled to policy vector module 440. Policy vector database module 470 can be, for example, a memory configured to store a group of policy vectors. Policy vector module 440 can be configured to provide an index value to policy vector database module 470 and receive policy vector S3 from policy vector database module 470.

In some embodiments, range selection module 430 can include a controller (not shown) configured to direct interactions and/or transmission of signals and data between memory module 431, comparison module 433, address generation module 436, and/or other modules or logic of range selection module 430. In some embodiments, memory module 431, comparison module 433, and/or address generation module 436 are indirectly operatively coupled one to another via a controller or a bus (not shown) within range selection module 430. In some embodiments, one or more of memory module 431, comparison module 433, address generation module 436, other modules or logic of range selection module 430, and/or policy vector module 440 can be integrated such that a single module conducts the functions of two or more modules discussed in relation to FIG. 7.

Figure 8:
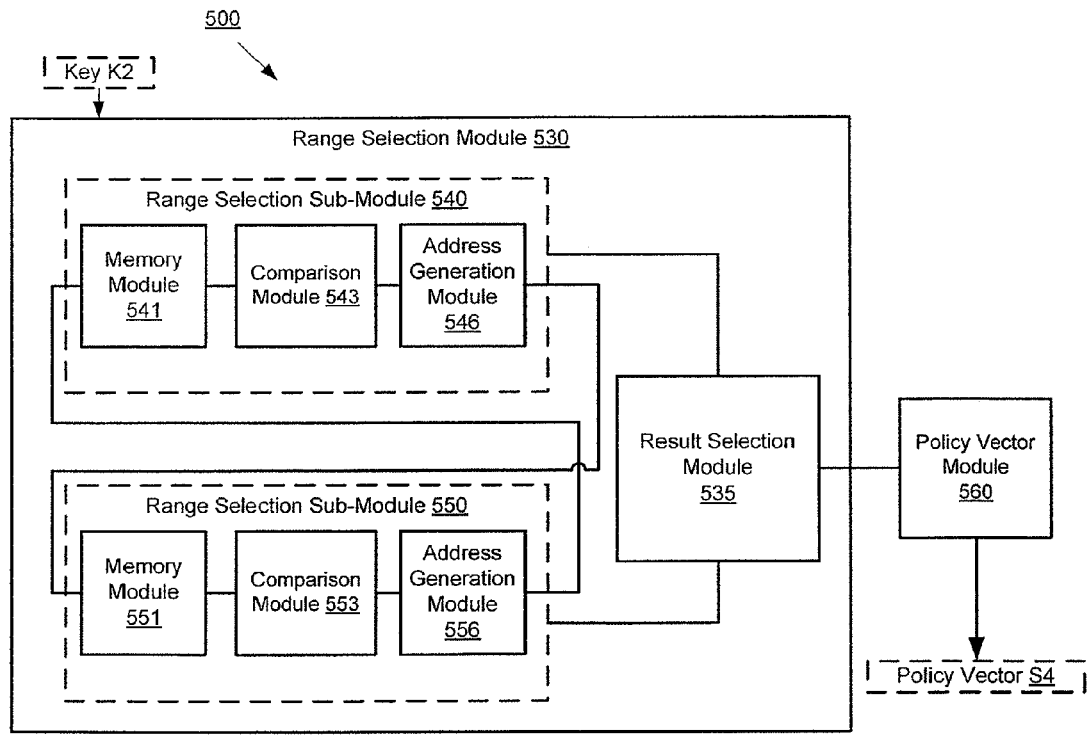
FIG. 8 is a system block diagram of another system for producing a policy vector associated with a key based on a binary tree structure, according to an embodiment.

FIG. 8 is a system block diagram of another system for producing a policy vector associated with a key based on a binary tree structure, according to an embodiment. System 500 includes range selection module 530 configured to produce an index value of a policy vector associated with a range of values, and policy vector module 560 configured to receive the index value and produce policy vector S4. Range selection module 530 includes range selection sub-module 540, range selection sub-module 550, and result selection module 535. Range selection sub-module 540 and range selection sub-module 550 are configured to cooperatively select a range of values based on a binary tree structure having nodes distributed across range selection sub-modules 540 and 550.

Range selection sub-module 540 and range selection sub-module 550 are each configured similar to range selection module 430. Range selection sub-module 540 includes memory module 541, comparison module 543, and address generation module 546. Memory module 541 is operatively coupled to comparison module 543 such that memory module 541 provides the node value of a node selected within memory module 541 to comparison module 543. Comparison module 543 is further configured to receive key K2 and compare the key with node values of nodes in memory module 541. Comparison module 543 is further configured to provide a comparison result to address generation module 546.

Range selection sub-module 550 includes memory module 551, comparison module 553, and address generation module 556. Memory module 551 is operatively coupled to comparison module 553 such that memory module 551 provides the node value of a node selected within memory module 551 to comparison module 553. Comparison module 553 is further configured to receive key K2 and compare the key with node values of nodes in memory module 551. Comparison module 553 is further configured to provide a comparison result to address generation module 556. Furthermore, range selection sub-module 540 and range selection sub-module 550 each store or maintain a reference or address value associated with root nodes of one or more trees in memory module 541 and memory module 551, respectively.

Range selection sub-module 540 and range selection sub-module 550 are also operatively coupled one to another such that a result or output of address generation module 546 of range selection sub-module 540 is provided to memory module 551 of range selection sub-module 550, and a result or output of address generation module 556 is provided to memory module 541 of range selection sub-module 540. Thus, the binary tree is distributed across memory module 541 and memory module 551 such that the child nodes of the nodes in memory module 541 are located in memory module 551 and the child nodes of the nodes in memory module 551 are located in memory module 541. In some embodiments, address generation module 546 and address generation module 556 can each be operatively coupled to memory module 551 and memory module 541. In such embodiments, child nodes of the nodes in each memory module can be located in either memory module because each address module is configured to provide an address value to either memory module.

Result selection module 535 is configured to select the index value to be output from range selection module 530 from the output of range selection sub-module 540 and the output of range selection sub-module 550. Range selection sub-module 540 and range selection sub-module 550 are configured to provide an indication or signal to result selection module 535 indicating availability of an index value. Result selection module 535 accesses the index value based on the signal and range selection module 530 provides the index value as an output from range selection module 540.

In some embodiments, range selection module 530 is a hardware module including logic configured as range selection sub-module 540, range selection sub-module 550, and result selection module 535. Result selection module 535 can be, for example, a hardware multiplexer. In some embodiments, a range selection module includes a priority multiplexer configured to select between a key and an address value as input to the result selection module. In some embodiments, an address value has a higher priority than a key.

In some embodiments, a range selection module can include more than two range selection sub-modules. A result selection module can be operatively coupled to each range selection sub-module such that the result selection module can select a result from the range selection sub-modules. In some embodiments, more than one binary tree can be located in a range selection module. For example, a range selection module can be configured to access the roots of two or more roots of binary trees within memory modules of the range selection module. Thus, a range selection module can traverse more than one binary tree to select an appropriate range for a key. Additionally, the range selection sub-modules of range selection module 530 can have alternative configurations including those discussed in relation to FIG. 4.

Although FIGS. 7 and 8 have been discussed with respect to binary trees, range selection module can be configured to accommodate higher dimension trees. For example, a memory module can be configured to store nodes associated with a multiple-way tree greater than two-way, a comparison module configured to compare a key with more than one node value, and an address generation module can be configured to determine an address value based on the type indicator associated with each node value and a result of the comparison module. In some embodiments, a multiple way tree is referred to as a K-way (or K-ary) or N-way (or N-ary) tree where K or N is greater than 1.

Figure 9:
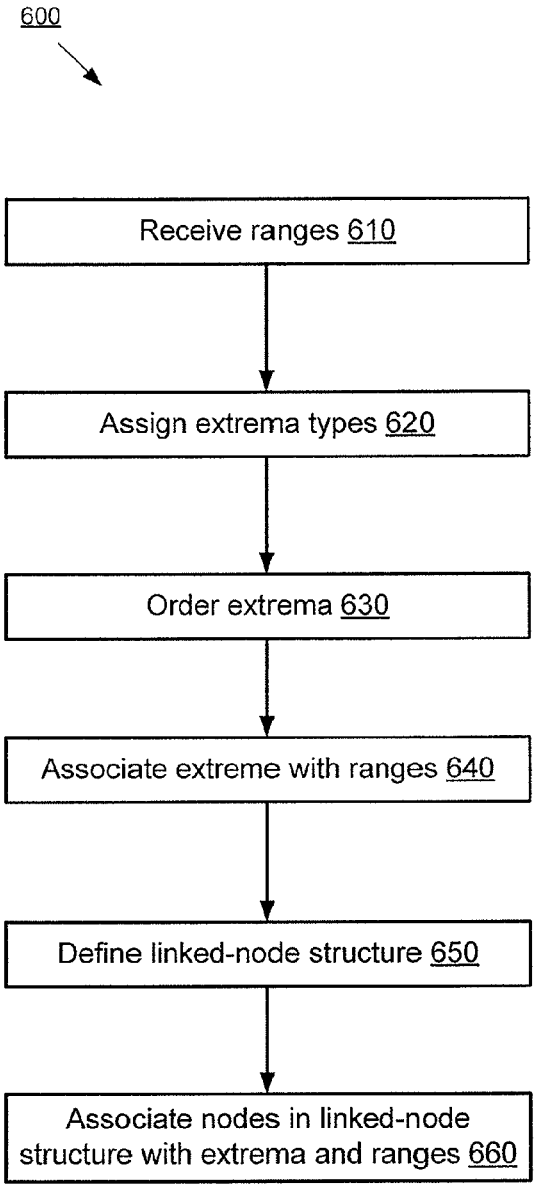
FIG. 9 is a flowchart of a process for producing a linked-node structure for selecting a range, according to an embodiment.
Figure 10:
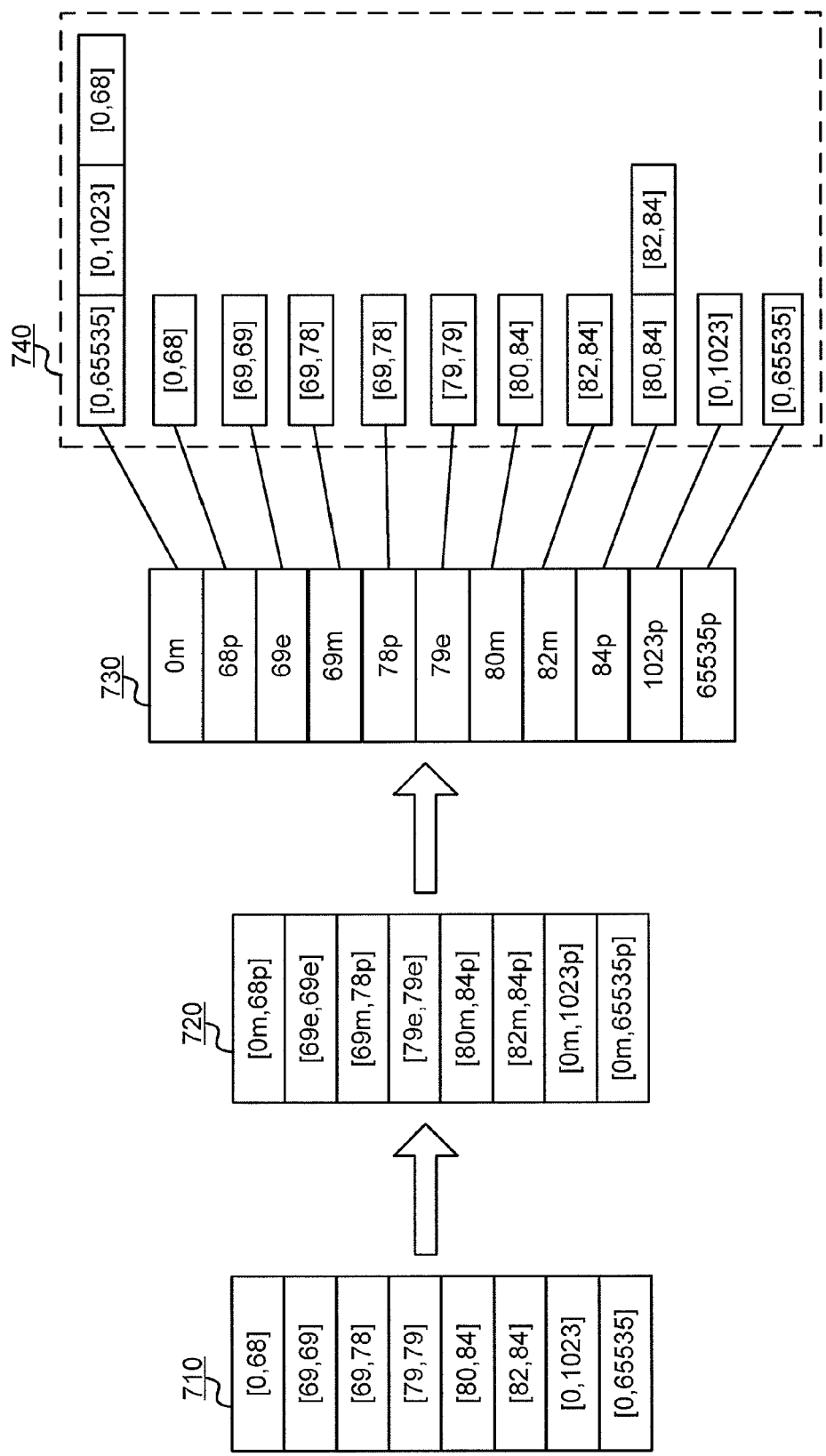
FIG. 10 illustrates the representation of a process of intermediate results produced by the steps of a process according to FIG. 9 for producing a linked-node structure for selecting a range, according to an embodiment.

FIG. 9 is a flowchart of process 600 for producing a linked-node structure for selecting a range, according to an embodiment. FIG. 10 illustrates the representation of a process of intermediate results produced by the steps of a process according to FIG. 9 for producing a linked-node structure for selecting a range, according to an embodiment. Ranges are received at 610. In one embodiment, for example, ranges can be ranges of source and/or destination port values associated with IP packets included in conditions (or, terms) of a firewall filter or data packet switch. In some embodiments, ranges can be ranges of IP address values associated with, for example, switch fabric routing. For example, list 710 of FIG. 10 illustrates ranges of IP port values associated with conditions in a packet filter or packet classification module associated with a switch fabric.

Returning to FIG. 9, an extrema type or range extreme type is assigned to each extreme of each range at 620. Range extreme types include plus, minus, and equal. For example, a range of destination ports associated with IP packets can be defined as destination ports 1024 through 65535. The low extreme 1024 is assigned an extrema type of low or minus. The high extreme 65535 is assigned an extrema type of high or plus. For ease of reference, ranges can be written as [low extreme, high extreme]. Thus, the range 1024 through 65535 can be written as [1024, 65535]. In some embodiments, a range can be inclusive of the range extrema. In some embodiments, a range can be exclusive of the range extrema.

Another range of destination ports can be defined as [80, 80]. This range is an exact range and each extreme 80 of this range is assigned an extrema type of equal. For the purposes of this discussion, the letter 'p' will be appended to extrema of type plus, the letter 'm' will be appended to extrema of type minus, and the letter 'e' will be appended to extrema of type equal. Thus, the ranges [1024, 65536] and [80, 80] have extrema of 1024m, 65535p, 80e, and 80e. List 720 of FIG. 10, for example, illustrates the ranges of IP port values after having extrema types associated with each extreme. Extrema types, however, can be indicated using a variety of methods according to embodiments. For example, a portion of a memory can be associated with an extreme to provide an indication of the extrema type of the extreme. More specifically, for example, two bits of memory in a node associated with an extreme in a binary tree can be used to represent the extrema types.

Returning again to FIG. 9, after the extrema have been assigned extrema types, the extrema are ordered at 630 and duplicate extrema are discarded such that each remaining extreme is distinct from the other extrema. Thus, the ranges [1024, 65536] and [80, 80] have extrema ordered as 80e, 1024m, and 65535p. Each distinct extrema is then associated with a range for which that extreme is an extreme. For example, a representation such as a tuple having integer values equal to the extrema of the range can be included in a node associated with a extreme in a binary tree. Accordingly, extreme 80e is associated with range [80, 80], extreme 1024m is associated with range [1024, 65535], and extreme 65535p is associated with range [1024, 65535]. Again referring to FIG. 10 as an example, list 730 illustrates the ordered list of extrema from the ranges of list 710 after removing duplicate extrema.

A linked-node structure is defined at 650 by, for example, allocating a portion of a memory for nodes to be associated with each extreme and linking the nodes such that the linked-node structure can be traversed from a root node. In some embodiment, the linked-node structure is a binary tree. In some embodiments, the linked-node structure is a balanced four-way tree. After the linked-node structure has been defined, the extrema and ranges are associated with the nodes in the linked-node structure at 650. For example, the extrema values, extrema types, and ranges can be copied from nodes associated with each extreme to a memory storing the nodes in the linked-node structure. Representation of structured data 740 of FIG. 10 illustrates a list of ranges, ordered from most specific to most broad, associated with each extreme in list 730. Extrema in representation of structured data 740 are associated with ranges for which they are an extrema. Thus, each extreme in list 730 of extrema type 'p' is associated with each range in list 710 having that extreme as a high extreme, each extrema of extrema type 'm' is associated with each range in list 710 having that extreme as a low extreme, and each extrema of type 'e' is associated with the exact or precise range having that extreme as its high and low extrema.

In some embodiments, the extrema, ranges, and extrema types are associated with nodes in the linked-node structure such that a predetermined relationship exists between the extreme of a node in the linked-node structure and the nodes to which that node is linked. For example, the extrema, ranges, and extrema types can be associated with a balanced binary tree such that all nodes to the left of a node have extrema with values greater than the value of the extreme of the node, and all nodes to the right of the node have extrema with values less than or equal to the extreme of the node.

In some embodiments, the steps of process 500 can be rearranged, steps can be removed, and/or additional steps can be added. For example, a linked-node structure can be defined immediately after the extrema are ordered. Additionally, in some embodiments, a memory can be configured as a linked node structure dynamically as nodes associated with extrema are stored in the memory, rather than statically configuring the memory as a linked node structure before associating the extrema and ranges with the nodes. Furthermore, in some embodiments, ranges having disjunctive overlaps are altered to remove the disjunctive overlap. A disjunctive overlap is an overlap of two ranges whereby neither range is entirely contained within the other. For example, the ranges [80, 84] and [82, 86] have a disjunctive overlap; ranges [80, 84] and [82, 84] do not have a disjunctive overlap.

Figure 11:
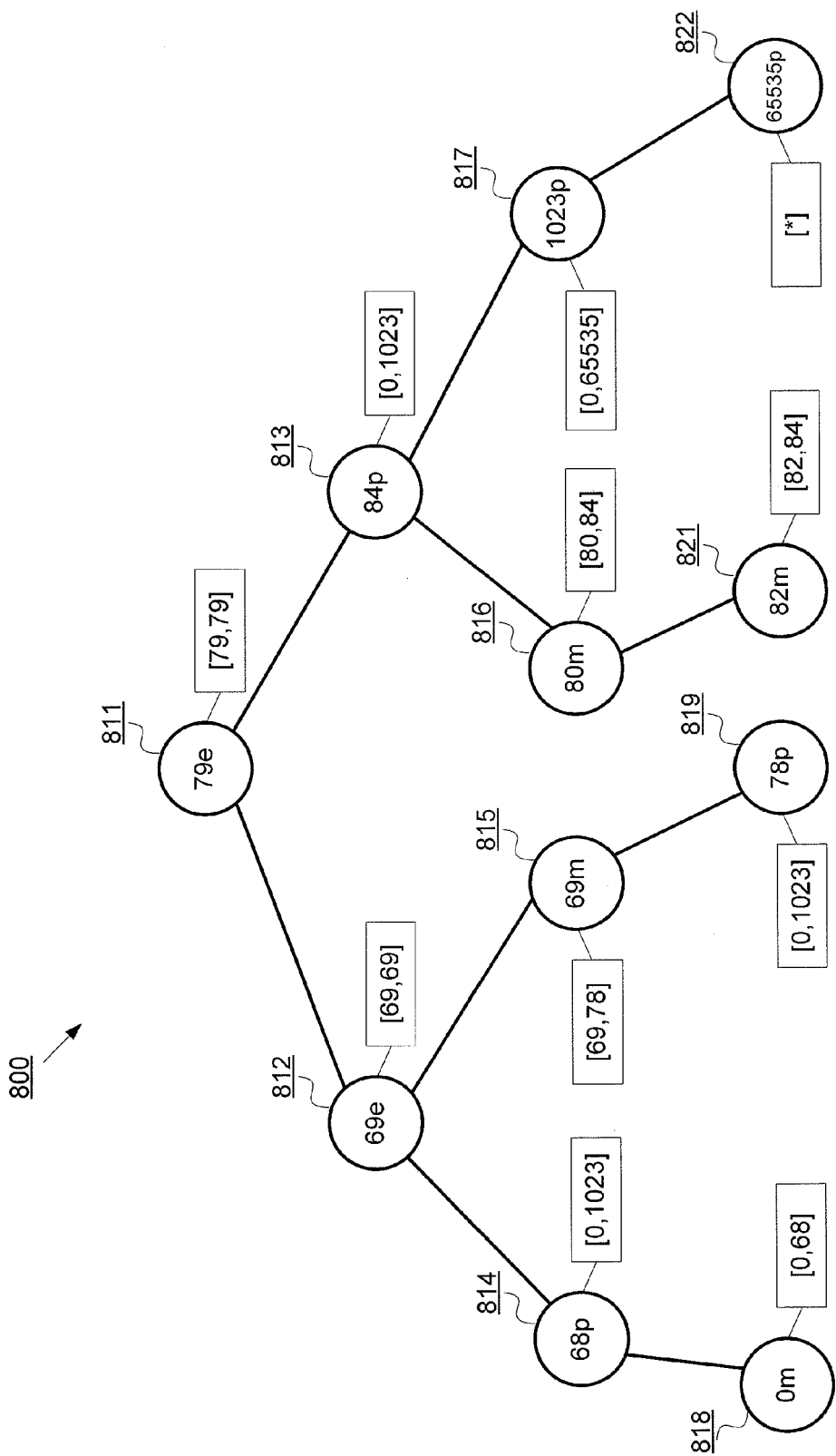
FIG. 11 is an illustration of a balanced binary tree associated with the range extrema of FIG. 7.

FIG. 11 is an illustration of balanced binary tree 800 associated with the range extrema of FIG. 10. FIG. 11 includes nodes 811, 812, 813, 814, 815, 816, 817, 819, 821, and 822. Each node is associated with a range extreme from list 730. For example, node 811 is associated with range extreme 79e and node 821 is associated with range extreme 82m. Additionally, each node is associated with a range from list 710. For example, node 812 is associated with range [69, 69] and node 816 is associated with range [0, 84].

Balanced binary tree 800 can be defined in a memory by determining the number of extrema in list 730 and configuring the memory to store a number of nodes equal to the number of extrema in list 730. The nodes can then be linked one to another in the memory by, for example, including a reference to other nodes in the memory within each node in the memory such that the nodes are structured as a balanced binary tree as shown in FIG. 11.

After the nodes have been linked, a single range from list 710 is associated with each extreme in list 730. In some embodiments, a stack is used to associate a single range from list 710 with each extreme in list 730 as follows. Beginning with the first extreme in list 730, 0m, the following is repeated for each extreme. If the extreme is a low extreme, the list of ranges associated with that extreme is pushed, least specific range first, onto the stack and the range at the top of the stack is associated with that extreme. If the extreme is a high extreme, the list of ranges associated with that extreme is popped from the stack and the range remaining at the top of the stack is associated with that extreme. If the extreme is associated with a range having a single value (i.e., the extrema type of the extreme is 'e' in FIG. 10), the precise or exact range is associated with the extreme. If the stack is empty, a default range is associated with that extreme (e.g., represented by '*' in FIG. 11 associated with node 722).

Extrema from list 730 can then be inserted into the balanced binary tree by inserting the extrema from list 730 into the memory storing the nodes of the balanced binary tree. In some embodiments, the extrema types are also inserted into the memory. In some embodiments, the ranges associated with each extreme are inserted into the memory and associated with the associated extrema. In some embodiments, each range is associated with a condition of a filter in a switch fabric represented by a policy vector. An index or address value of the policy vector associated with a range associated the an extreme can be inserted into the memory and associated with the extreme. Thus, the extreme is indirectly associated with the range based on the policy vector.

After the balanced binary tree is constructed in the memory, the nodes can be accessed to determine the most specific or narrow range from list 710 that includes a key. In one embodiment, for example, a key is a source port value associated with an IP packet and the ranges in list 710 are associated with a policy vector representing filter conditions for source port values of a filter in a switch fabric. The balanced binary tree can be traversed to determine the policy vector having the most specific condition for the source port value.

In some embodiments, a condition can be related to a prefix length of an address value and/or a range of port values. The condition can be satisfied, for example, when a port value included in a data packet falls within a specified range of port values. In some embodiments, this type of condition can be referred to as a match condition or as a filter condition. In some embodiments, an instruction associated with a condition can be related to, for example, routing of a data packet through a switch fabric of a multi-stage switch.

A packet classification module, for example, (including any sub-modules and/or memory) can be implemented in hardware. For example, sub-modules of the packet classification module that are configured to process the data packet based on one or more conditions associated with a policy can be implemented in hardware. In addition, sub-modules of the packet classification module that are configured to execute an instruction associated with a policy can be implemented in hardware. In some embodiments, the packet classification module (including sub-modules and memory) can be integrated on a single semiconductor chip. In some embodiments, one or more portions of the packet classification module can be implemented in software, or implemented in a combination of hardware and software. More details related to packet classification modules are set forth in U.S. patent application Ser. No. 12/242,168, filed on Sep. 30, 2008, and entitled "Methods and Apparatus Related to Packet Classification Associated with a Multi-Stage Switch," now U.S. Pat. No. 7,961,734, which is incorporated herein by reference in its entirety.

In some embodiments, a portion of a multi-stage switch can be configured to trigger another portion of the multi-stage switch to execute an instruction associated with a policy. In some embodiments, a multi-stage switch can be configured to trigger, based on a policy vector, execution of an instruction at a separate entity. In some embodiments, a data packet can be processed based on a policy that is associated with a group of data packets. In some embodiments, the group of data packets can be referred to as a data packet flow or as a flow.

In some embodiments, a vector, such as the policy vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if a packet classification module is implemented in a hardware system that is a base-n system (e.g., a base-4 system), a vector processed by the packet classification module can be a base-n string. In some embodiments, the vector can be defined as a one-dimensional array. In some embodiments, for example, if a packet classification module is implemented in software, a vector processed by the packet classification module can be a string that includes a sequence of symbols (e.g., American Standard Code for Information Interchange (ASCII) characters) and/or digits. For example, the vector can be a byte string or a hexadecimal value.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, embodiments discussed in relation to binary trees can be applicable to embodiments based on trees of higher dimensions.

What is claimed is:

1. An apparatus, comprising:
a memory module to store a plurality of nodes, a first node from the plurality of nodes including (1) a range extreme, (2) a reference to a second node from the plurality of nodes, and (3) a memory address of a policy vector from a plurality of policy vectors and associated with a range represented by the range extreme;
a comparison module operatively coupled to the memory module, the comparison module to produce a result based on a relationship between a key representing a portion of a data packet and the range extreme of the first node from the memory module; and
a policy vector module to retrieve the policy vector when the result is a range match result.

2. The apparatus of claim 1, further comprising:
a policy vector database module to store the plurality of policy vectors, each policy vector from the plurality of policy vectors being associated with a range from a plurality of ranges,
the policy vector module to retrieve the policy vector from the policy vector database when the result is a range match result.

3. The apparatus of claim 1, wherein the plurality of nodes are configured as a substantially balanced linked-node structure.

4. The apparatus of claim 1, wherein the plurality of nodes are configured as a binary tree.

5. The apparatus of claim 1, wherein the plurality of nodes are configured as a four-way tree.

6. The apparatus of claim 1, wherein the plurality of nodes are configured as an N-way tree, N being greater than 1.

7. An apparatus, comprising:
a first range selection module including a memory module to store a first plurality of nodes and produce a first result, the first range selection module including a comparison module and a priority multiplexer operatively coupled to the memory module of the first range selection module;
a second range selection module including a memory module to store a second plurality of nodes and produce a second result, the second range selection module including a comparison module and a priority multiplexer operatively coupled to the memory module of the second range selection module, the first range selection module being operatively coupled to the second range selection module; and
a result selection module operatively coupled to the first range selection module and the second range selection module, the result selection module to produce an address value associated with a policy vector based on the first result and the second result.

8. The apparatus of claim 7, wherein:
the priority multiplexer of the first range selection module is to select between a key and an address value associated with the first plurality of nodes to produce the first result; and the priority multiplexer of the second range selection module is to select between the key and an address value associated with the second plurality of nodes to produce the second result.

9. The apparatus of claim 7, further comprising a policy vector lookup module configured to produce the policy vector based on the address value from the result selection module.

10. The apparatus of claim 7, wherein:
each node from the first plurality of nodes is configured to include a first range extreme and a second range extreme,
each node from the first plurality of nodes is configured to include a reference to its own first node from the second plurality of nodes and configured to include a reference to its own second node from the second plurality of nodes.

11. The apparatus of claim 7, further comprising a policy vector module operatively coupled to the result selection module, the policy vector module configured to receive the address value and produce the policy vector.

12. The method of claim 7, wherein:
the comparison module of the first range selection module is configured to perform a first comparison and a second comparison, the second comparison being substantially simultaneous with the first comparison.

13. The apparatus of claim 7, wherein the first plurality of nodes and the second plurality of nodes are collectively configured as a substantially balanced linked-node structure.

14. An apparatus, comprising:
a memory to store a plurality of range extrema including a first range extreme and a second range extreme, the memory to store the first range extreme and a range extreme type of the first range extreme at a first portion of the memory and the second range extreme and a range extreme type of the second range extreme at a second portion of the memory;
a comparison module to compare a key value associated with a portion of a data packet with (1) the first range extreme associated with a first range to identify a first result and (2) the second range extreme associated with a second range to identify a second result, the range extreme type of the first range extreme being a first value when the first range extreme is a high extreme and a second value when the first range extreme is a low extreme;
a range selection module to select the second range extreme from the plurality of range extrema based on the first result and the range extreme type of the first range extreme, the range extreme type of the second range extreme being the first value when the second range extreme is a high extreme and the second value when the second range extreme is a low extreme; and
a policy vector module to produce a policy vector associated with the first range or the second range based on the second result and the range extreme type of the second range extreme.

15. The apparatus of claim 14, wherein the first range is associated with an address value representing a location of the policy vector within the memory.

16. The apparatus of claim 14, wherein the second range extreme has a value that is greater than a value of a low range extreme of the second range and less than a value of a high range extreme of the second range.

17. The apparatus of claim 14, wherein the key value represents a destination port value within the data packet.

18. The apparatus of claim 14, wherein the key value represents a source port value within the data packet.

19. The apparatus of claim 14, further comprising
a policy vector database module to store a plurality of policy vectors including the policy vector, each policy vector from the plurality of policy vectors being associated with a range from a plurality of ranges, the plurality of ranges including the first range and the second range, the policy vector module to retrieve the policy vector from the from the policy vector database.

20. The apparatus of claim 14, wherein the policy vector is configured to trigger routing of the data packet through a switch fabric.

\* \* \* \* \*

UNITED STATES PATENT AND TRADEMARK OFFICE
CERTIFICATE OF CORRECTION

PATENT NO.         : 8,139,591 B1                                Page 1 of 1
APPLICATION NO.    : 12/874681
DATED              : March 20, 2012
INVENTOR(S)        : Deepak Goel et al.

It is certified that error appears in the above-identified patent and that said Letters Patent is hereby corrected as shown below:

Column 20, line 35, delete "from the"

Signed and Sealed this
Fifteenth Day of May, 2012

David J. Kappos
*Director of the United States Patent and Trademark Office*